United States Patent
Yost et al.

(10) Patent No.: US 8,402,778 B2
(45) Date of Patent: Mar. 26, 2013

(54) METHOD FOR ENHANCING MINERAL OIL MISCIBILITY AND OIL RETURN

(75) Inventors: Robert W. Yost, Wilmington, DE (US); James P. Lavelle, Roslyn, PA (US); Umar M. Khokhar, South River, NJ (US)

(73) Assignee: National Refrigerants, Inc., Philadelphia, PA (US)

( * ) Notice: Subject to any disclaimer, the term of this patent is extended or adjusted under 35 U.S.C. 154(b) by 1395 days.

(21) Appl. No.: 12/059,240

(22) Filed: Mar. 31, 2008

(65) Prior Publication Data

US 2009/0241565 A1 Oct. 1, 2009

(51) Int. Cl.
*C09K 5/04* (2006.01)
*F25B 43/02* (2006.01)

(52) U.S. Cl. ......... 62/84; 62/114; 62/192; 252/67; 252/68; 252/69

(58) Field of Classification Search ............. 62/84, 114, 62/192; 252/67, 68, 69
See application file for complete search history.

(56) References Cited

U.S. PATENT DOCUMENTS

| | | | | |
|---|---|---|---|---|
| 5,369,287 A | * | 11/1994 | Sunaga et al. | 508/437 |
| 5,421,192 A | * | 6/1995 | Henry | 73/40.7 |
| 5,452,586 A | * | 9/1995 | Hamid | 62/84 |
| 5,494,597 A | * | 2/1996 | Krevalis et al. | 252/68 |
| 5,688,432 A | | 11/1997 | Pearson | |
| 5,716,916 A | * | 2/1998 | Shiokawa et al. | 508/485 |
| 5,853,609 A | | 12/1998 | Schnur | |
| 5,866,030 A | * | 2/1999 | Reyes-Gavilan et al. | 252/68 |
| 6,221,272 B1 | | 4/2001 | Schnur | |
| 6,251,300 B1 | | 6/2001 | Takigawa | |
| 6,436,309 B1 | | 8/2002 | Anker | |
| 6,606,868 B1 | | 8/2003 | Powell | |
| 6,656,891 B1 | | 12/2003 | Sakanoue | |
| 6,863,840 B2 | | 3/2005 | Goble | |
| 7,018,558 B2 | * | 3/2006 | Schnur et al. | 252/68 |
| 7,157,020 B2 | | 1/2007 | Leck | |
| 7,176,169 B2 | | 2/2007 | Gibb | |
| 7,208,098 B2 | | 4/2007 | Li | |
| 7,229,567 B2 | | 6/2007 | Roberts | |
| 7,332,102 B2 | * | 2/2008 | Ponder et al. | 252/68 |
| 7,943,380 B2 | * | 5/2011 | Westman et al. | 436/4 |
| 8,197,706 B2 | * | 6/2012 | Ponder et al. | 252/68 |
| 2004/0209789 A1 | * | 10/2004 | Swallow et al. | 508/485 |
| 2004/0262567 A1 | * | 12/2004 | Wilson | 252/68 |
| 2005/0029488 A1 | * | 2/2005 | Li et al. | 252/68 |
| 2005/0082510 A1 | | 4/2005 | Ponder | |
| 2006/0191665 A1 | | 8/2006 | Ponder | |
| 2007/0187640 A1 | * | 8/2007 | Li et al. | 252/68 |
| 2009/0001311 A1 | * | 1/2009 | Brown et al. | 252/68 |

FOREIGN PATENT DOCUMENTS

WO  WO 9719144 A1 * 5/1997

\* cited by examiner

*Primary Examiner* — Marc Norman
(74) *Attorney, Agent, or Firm* — Roylance, Abrams, Berdo & Goodman, L.L.P.

(57) ABSTRACT

The present invention relates to a method for increasing the solubility of oils in refrigerant compositions within a system using a refrigerant compressed with a mechanical device by adding polyolester directly to the refrigerant followed by charging a mixture of the polyolester and refrigerant into the system (air conditioner, refrigerator, etc.). The present invention also relates to a method of optimizing mineral oil return in a system using a refrigerant compressed with a mechanical device and a method of cleansing heat exchange tubes of a system using a refrigerant compressed with a mechanical device by adding polyolesters directly to a refrigerant composition followed by charging a mixture of the polyolester and refrigerant into the system.

17 Claims, No Drawings

METHOD FOR ENHANCING MINERAL OIL MISCIBILITY AND OIL RETURN

FIELD OF THE INVENTION

The present invention relates to methods for increasing the solubility of oils, such as mineral oil, in refrigerant compositions, permitting efficient return of mineral oil from non-compressor zones back to a compressor zone in a system using a refrigerant compressed with a mechanical device, and cleansing of heat exchange tubes of a system using a refrigerant compressed with a mechanical device.

BACKGROUND OF THE INVENTION

Chlorine-free refrigerants are desirable for use in refrigerant systems, because their escape into the atmosphere causes less damage to the environment than most commonly used chlorofluorocarbon-based refrigerants (CFC) and hydrochlorofluorocarbon-based refrigerants (HCFC). CFCs are stable, of low toxicity and non-flammable providing low hazard working conditions when used in refrigeration and air conditioning systems. When released, they permeate into the stratosphere and attack the ozone layer which protects the environment from damaging effects of ultraviolet rays.

R-22 is a chemical fluid and by far the largest HCFC refrigerant used globally in refrigeration and air conditioning equipment. R-22 is the subject of a phase-out schedule and any replacement refrigerants cannot deplete the ozone layer. The availability of R-22 will likely be a problem after the HCFC phase-out, and existing equipment using R-22 will need to be retrofitted to a new refrigerant. In normal situations, the compressor must be removed to drain the existing the oil when retrofitting which is a time consuming and costly procedure. Thus, there is a need in the refrigeration and air conditioning industry to provide a refrigerant replacement where replacing the existing oil in the compressor is unnecessary when retrofitting from R-22.

Mineral oils and alkylbenzenes have been conventionally used as lubricants in CFC and HCFC refrigeration systems. However, the lack of solubility of these lubricants in the replacement, non-ozone depleting, hydrofluorocarbon (HFC) refrigerants has precluded their use and necessitated development and use of alternative lubricants for HFC refrigeration systems. Additionally, mineral oils and alkylbenzenes have the desirable feature of being less hygroscopic than the lubricants used with HFCs, and have low solubility, less than 100 ppm, for water. Thus, there is a need and an opportunity to resolve this low HFC refrigerant solubility problem so that the refrigeration industry may utilize mineral oil and alkylbenzene lubricants with HFC-based refrigerants.

HFC refrigerants are replacing CFCs and HCFCs. As detailed above, HFC-based refrigerant mixtures are less soluble than CFCs or HCFCs in conventional refrigeration lubricants such as mineral oils and alkylbenzenes. A lubricant change from mineral oil or alkylbenzene to polyolester lubricants is often required when HFC or HFC mixtures are used to replace pure CFC or HCFC-based refrigerants, resulting in more expense to the refrigeration industry. Thus, there is a need and opportunity to resolve this low solubility problem so that the refrigeration industry may utilize HFC-based refrigerants with mineral oil or alkylbenzene lubricants without having to switch to polyolester lubricants.

In normal hermetic, semi-hermetic or open-drive compressors operating under normal conditions, the compressor pumps oil, such as mineral oil, into the system, condensor side to be specific, holding the refrigerant (air conditioner, refrigerator, etc.). Any amount of oil that is not miscible in the refrigerant composition accumulates in the system and does not readily return to the compressor. This leads to lower amounts of oil return to the compressor, and low levels of lubricating oil in the compressor. A cycle is created of decreased oil return followed by a decreased amount of oil in the compressor and less oil pumped from the compressor into the system. Thus, there is a need and opportunity to resolve this cycle of decreased amount of oil return from the system to the compressor and decreased amount of oil in the compressor.

Traditional methods to improve oil circulation with HFC refrigerants involves the use of solvents that reduce the viscosity of the oil allowing the oil to return from the system more readily. These solvents have high solubility in the oil promoting greatly reduced oil viscosity in the colder parts of the system. These solvents do not promote enhanced solubility of the oil in the liquid refrigerant, and may lead to miscibility problems in the system. There is a need to both simultaneously improve the oil circulation while enhancing the miscibility of the oil in the liquid HFC refrigerant. Known in the art are bridge solvents or compatabilizer solvents which are added to oils to enhance the miscibility thereof. Bridge solvent is a trade terminology for an agent which brings together two phases of a mixture which would not normally come together to form a homogeneous mixture. Examples are oxygenated solvents, such as acetone, which have relatively low boiling points. Additionally, adding the bridge solvents or compatabilizer solvents to the oils directly is difficult because the system is sealed, or leads to problems because of excessive viscosity reduction of the oil in the compressor and potential refrigerant or oil flammability problems. Thus, there is a need and opportunity to provide a method for enhancing the solubility of oils in refrigerant compositions by providing an oil solubility enhancer directly to the refrigerant composition to avoid problems associated with viscosity reducers, bridge solvents or compatabilizer solvents. An additional benefit of the bridge solvents is their higher polarity which leads to a preferential affinity for the metal walls of the tubes in the system. This promotes removal of mineral oil residues from the walls of the system and acts as a cleaning agent.

There is also a need and opportunity to enable the addition of an agent directly to an HFC refrigerant followed by charging the agent/HFC refrigerant mixture directly into the system (air conditioner, refrigerator, etc.) through the system charge ports.

SUMMARY OF THE INVENTION

It is an object of the present invention to provide a method for increasing the solubility of oils, preferably mineral oils, in refrigerant compositions within a system using a refrigerant compressed with a mechanical device (such as, hermetic, semi-hermetic or open-drive compressor systems) by adding polyolester directly to a refrigerant followed by charging the mixture of polyolester and refrigerant into the system (air conditioner, refrigerator, etc.).

It is a further object of the present invention to provide a method of optimizing mineral oil return in a system using a refrigerant compressed with a mechanical device (such as, hermetic, semi-hermetic or open-drive compressor systems) by adding polyolester directly to a refrigerant composition.

It is yet a further object of the present invention to provide a method for cleansing heat exchange tubes of a system using a refrigerant compressed with a mechanical device (such as, hermetic, semi-hermetic or open-drive compressor systems) by adding polyolester directly to a refrigerant composition.

As used herein, hermetic compressor shall mean a compressor where the electric motor is in the same totally welded casing as the compressor. The motor is cooled by the refrigerant vapor returning to the compressor. The heat generated by the motor is removed through the condensor.

As used herein, a semi-hermetic compressor is similar to a hermetic compressor, the major difference being the casing has a bolted joint which can be opened to enable the motor and compressor to be serviced.

As used herein, open-drive compressor shall mean a compressor which raises the pressure, temperature and energy level of a refrigerant vapour which is driven by an external drive, usually a motor.

Other aspects and advantages of the invention will become apparent from the following detailed description of the invention which disclose various embodiments of the invention.

DETAILED DESCRIPTION OF THE INVENTION

Except in the claims and the operating examples, or where otherwise expressly indicated, all numerical quantities in this description indicating amounts of material or conditions of reaction and/or use are to be understood as modified by the term "about" or "approximately" in defining the broadest scope of the invention. Practice of the invention within the boundaries corresponding to the exact quantities stated is usually preferable, however.

The present invention is directed to a method for increasing the solubility of oils in a refrigerant composition of a system using a refrigerant compressed with a mechanical device (such as, hermetic, semi-hermetic or open-drive compressor systems). Positive displacement compressors, a reciprocating or rotary compressor, used in refrigeration systems suck in small amounts of lubricant from the crank case. The lubricant is then ejected with the refrigerant vapor through the compressor exhaust. In order to maintain compressor lubrication, the oil must be forced around the system by the refrigerant stream and returned to the crank case. The present method is particularly suitable for hermetically or semi-hermetically sealed compressors for domestic air conditioners and refrigerators, where long lubricant service lifetimes are important because of the difficulty and expense of supplying additional lubricant after the initial assembly of the compressor.

As discussed above, CFC and HCFC refrigerants are miscible with hydrocarbon oils and hence carry the oils around the system. However, HFC refrigerants and hydrocarbon lubricants have low mutual solubilities, therefore effective oil return may not occur. The problem is particularly acute in evaporators where low temperatures can increase the viscosities of oils sufficiently to prevent them from being carried along the heat exchange tubes, and thus causing aggregation of oils in those tubes. With CFCs and HCFCs, enough refrigerant remains in the oil to reduce the viscosities to enable oil return to occur. However, as detailed above, CFC and HCFC-based refrigerants are being phased-out.

When using HFCs with mineral type lubricants, oil return can be facilitated by introducing into the system, and specifically into the refrigerant composition, an agent that has the following properties: (1) sufficient solubility in the refrigerant composition thus preventing any worries about separation or suspension issues; and (2) the ability to increase the miscibility of the oil lubricant in HFC refrigerants. Polyolesters fulfill these requirements.

Specifically, polyolesters are added directly to the HFC refrigerant composition. This step of adding the polyolester is followed by charging the mixture of polyolester and HFC refrigerant into the system (air conditioner, refrigerator, etc.). Charging of the system is done by using the existing factory connections of the system rather than creating a new field connection. Adding polyolesters directly to the refrigerant is preferred in R-22 retrofit systems, where replacement of the oil in the compressor is rendered unnecessary.

Preferred refrigerants include an HFC or a blend of different HFCs that provide the desired properties for the particular application. HFCs are defined as compounds having 1 to 5 carbon atoms, at least one hydrogen atom per molecule and at least one fluorine atom per molecule. HFCs generally do not have chlorine, bromine, or other atoms contained therein except as contaminants from manufacturing processes or handling. The HFCs include but are not limited to R-134a, R-125, R-32, R-143a and blends thereof. The HFCs of interest in this disclosure are those having suitable vapor pressures and handling characteristics for compression refrigeration. For the purposes of this disclosure compression refrigeration includes refrigeration, air conditioning, cooling, heat pumps, etc.

Preferred polyolesters are those which are miscible with HFC refrigerants over the operational temperature range of compression refrigeration systems for air conditioning, refrigeration, freezers etc. Preferred polyolesters include neopentyl polyolesters, which are well known in the art. They include but are not limited to neopentyl glycol, trimethylol propane, pentaerythritol, dipentaerythritol and higher polyether oligomers of pentaerythritol, or mixtures thereof (such as pentaerythritol and dipentaerythritol). They are characterized by not having hydrogen atoms attached directly to the beta carbon (the alpha carbon being attached to the oxygen of the polyol or polyolester (depending on whether viewing the polyol or polyolester)). The preferred polyolester is based on pentaerythritol (a C5 polyol with 4 hydroxyl groups) and a combination of linear and branched mono acids. The linear acids are C5 and C7, and the branched is C9. However, any polyolester that increases the solubility of mineral oils and alkylbenzenes in HFC refrigerants may be employed.

Oils as detailed above are oils that are conventionally employed as lubricants in CFC and HCFC refrigeration systems. These oils comprise the family of compounds commonly known in this field as mineral oils or synthetic oils. Mineral oils comprise paraffins (straight-chain and branched-carbon-chain, saturated hydrocarbons), naphthenes (cyclo-paraffins), aromatics (unsaturated, cyclic hydrocarbons containing one or more rings characterized by alternating double bonds), and non-hydrocarbons (molecules containing atoms such as sulfur, nitrogen, or oxygen in addition to carbon and hydrogen). Synthetic oils comprise alkylaryls (such as linear and branched-alkyl-chain alkylbenzenes), synthetic paraffins, and polyalphaolefins.

As detailed above, polyolester is added directly to the refrigerant composition to form a mixture followed charging the mixture directly into the system (air conditioner, refrigerator, etc.). The amount of polyolester added to the refrigerant directly is enough such that a solution or stabilized dispersion of the refrigerant and lubricating oil (for example, mineral oil or alkylbenzene) is formed. By "stabilized dispersion," it is meant that a dispersion of the refrigerant and oil is formed such that oil is returned with the refrigerant from non-compressor zones to a compressor zone in a refrigeration system in a quantity which maintains acceptable compressor lubrication and thus overall refrigeration system operation.

The amount of polyolester added to the refrigerant composition directly is approximately 1-20% by weight of the total refrigerant composition. Preferably, the amount of polyolester added to the refrigerant composition is approximately 1-10% by weight of the total refrigerant composition.

More preferably, the amount of polyolester added to the refrigerant composition is approximately 1-5% by weight of the total refrigerant composition. Most preferably, the amount of polyolester added to the refrigerant composition is approximately 1-3% by weight of the total refrigerant composition.

Various optional additives can be included in the polyolester/HFC refrigerant mixture, such as, antiwear additives, antifoam additives, and dispersant additives. A typical antiwear additive would be an alkylaryl phosphate such as tricresyl phosphate (TCP). An example of an antifoam agent would be silicone oil. Dispersant additives include those which help disperse marginally soluble mineral oil in the polyolester/HFC refrigerant mixture, such as succinates.

As detailed above, aggregation of oils in heat exchange tubes is a common problem in the art. An exemplary embodiment of the present invention relates to a method of cleansing heat exchange tubes of a system using a refrigerant compressed with a mechanical device (such as, hermetic, semi-hermetic or open-drive compressor systems) by adding a polyolester directly to a refrigerant composition to form a mixture that is charged directly into the system (air conditioner, refrigerator, etc.). The polyolester presents itself as a cleansing agent to remove oil aggregates from surfaces of heat exchange tubes. Aggregation occurs not only due to the low solubility of the oils in the refrigerant compositions, but also because of increased viscosities of oils in low temperature situations. Addition of polyolester directly to the refrigerant enhances the miscibility of oils in the refrigerants, thus preventing aggregation due to solubility or viscosity issues.

The polyolesters of the present invention will have a boiling point that is approximately 250° C. The boiling point of the polyolester will be greater than that of the refrigerant composition as well as other agents, such as, hydrocarbons. Additionally, the viscosity of the polyolester will be greater than that of the refrigerant composition. In this manner, the polyolester (a viscous material) simultaneously enhances the miscibility of oils in the refrigerant composition and lubricates the compressor.

Table 1: The table below shows the effect of added polyolester (POE) to the solubility of naphthenic mineral oil (NMO) and alkylbenzene (AB) lubricants with various refrigerants. The data shows the polyolester dissolves the relatively insoluble mineral oil and the relatively insoluble alkylbenzene lubricants into HFC refrigerants (shown below as the percent high boiling residue (% HBR), which details the percent of oil dissolved in liquid refrigerant). The addition of more polyolester allowed more of the insoluble lubricant to dissolve into the HFC refrigerant.

TABLE 1

Oil Solubility/Miscibility Results

| Refrigerant | % Refrigerant | % NMO | % AB | % POE | % HBR |
|---|---|---|---|---|---|
| R-502 | 85 | 15 | 0 | 0 | 3.91 |
| R-502 | 80 | 20 | 0 | 0 | 4.76 |
| R-502 | 85 | 0 | 15 | 0 | 15 |
| R-502 | 80 | 0 | 20 | 0 | 20 |
| R-404A | 85 | 0 | 0 | 15 | 15 |
| R-404A | 80 | 20 | 0 | 0 | 0.58 |
| R-404A | 80 | 15 | 0 | 5 | 3.79 |
| R-404A | 80 | 10 | 0 | 10 | 5.64 |
| R-404A | 80 | 0 | 0 | 20 | 11 |
| R-404A | 80 | 0 | 10 | 10 | 5.12 |
| R-404A | 80 | 0 | 15 | 5 | 3.08 |
| R-404A | 80 | 0 | 20 | 0 | 0.97 |
| R-422A | 85 | 15 | 0 | 0 | 0.57 |
| R-422A | 80 | 20 | 0 | 0 | 0.92 |
| R-422A | 80 | 18 | 0 | 2 | 2.52 |
| R-422A | 80 | 15 | 0 | 5 | 4.66 |
| R-422A | 80 | 10 | 0 | 10 | 8.74 |
| R-422A | 80 | 0 | 20 | 0 | 1.86 |
| R-422A | 80 | 0 | 18 | 2 | 2.53 |
| R-422A | 80 | 0 | 15 | 5 | 4.7 |
| R-402A | 85 | 15 | 0 | 0 | 1.7 |
| R-402A | 80 | 20 | 0 | 0 | 2.06 |
| R-402A | 80 | 10 | 10 | 0 | 2.11 |
| R-402A | 80 | 0 | 20 | 0 | 3.45 |
| R-402A | 80 | 18 | 0 | 2 | 3.65 |
| R-402A | 80 | 15 | 0 | 5 | 6.46 |
| R-408A | 85 | 15 | 0 | 0 | 2.07 |
| R-408A | 80 | 20 | 0 | 0 | 1.69 |
| R-408A | 80 | 10 | 10 | 0 | 1.96 |
| R-408A | 80 | 0 | 20 | 0 | 5.46 |
| R-408A | 80 | 18 | 0 | 2 | 4.27 |
| R-408A | 80 | 15 | 0 | 5 | 7.2 |
| R-417A | 85 | 15 | 0 | 0 | 0.87 |
| R-417A | 80 | 20 | 0 | 0 | 0.78 |
| R-417A | 80 | 10 | 10 | 0 | 0.98 |
| R-417A | 80 | 0 | 20 | 0 | 1.11 |
| R-417A | 80 | 18 | 0 | 2 | 1.81 |
| R-417A | 80 | 15 | 0 | 5 | 5 |
| SP34E | 85 | 15 | 0 | 0 | 1.22 |
| SP34E | 80 | 20 | 0 | 0 | 1.54 |
| SP34E | 80 | 10 | 10 | 0 | 2.04 |
| SP34E | 80 | 0 | 20 | 0 | 1.22 |
| SP34E | 80 | 18 | 0 | 2 | 2.65 |
| SP34E | 80 | 15 | 0 | 5 | 4.55 |
| R-22 | 82 | 18 | 0 | 0 | 11.48 |
| R-422D | 81 | 19 | 0 | 0 | 0.49 |
| R-422D | 82 | 17 | 0 | 1 | 1.9 |
| R-422D | 82 | 16 | 0 | 2 | 2.06 |
| R-422D | 82 | 15 | 0 | 3 | 3.7 |
| R-422D | 82 | 14 | 0 | 4 | 4.11 |
| R-427A | 82 | 17 | 0 | 1 | 1.66 |
| R-427A | 82 | 16 | 0 | 2 | 2.11 |
| R-427A | 82 | 15 | 0 | 3 | 2.71 |
| R-427A | 82 | 14 | 0 | 4 | 3.49 |
| R-421A | 83 | 17 | 0 | 0 | 0.59 |
| R-421A | 82 | 16 | 0 | 2 | 3.64 |
| R-421A | 83 | 13 | 0 | 4 | 3.95 |
| R-421A | 83 | 8.5 | 0 | 8.5 | 8.10 |

The following example is taken from the table above:

Example 1

R-404A (R-125/R-143a/R-134a) and 15% Polyolester (POE) Lubricant

Liquid R-404A and POE lubricant will mix together at any concentration, and vapor R-404A will be readily absorbed into POE. In a refrigeration system using this refrigerant/lubricant combination, oil return will progress as described below:

Compressor Discharge: regardless of the amount of POE discharged, the warmer (lower viscosity) oil will be pushed by R-404A vapor into the condenser.

Condenser: as R-404A is condensed to liquid, the POE will mix entirely with it and move along to the end of the condenser.

Receiver: if there is a receiver, the POE and R-404A will remain mixed and move out along the liquid line to the valve.

Evaporator: the POE will move with the liquid R-404A towards the end of the evaporator. When the R-404A boils off, the remaining POE will retain some absorbed refrigerant (lowering its viscosity), and the POE will be pushed out of the evaporator by the refrigerant vapor.

Suction Line: in a properly sized suction line, R-404A vapor will push the POE, with absorbed R-404A and reduced viscosity, back along the tubing into the compressor inlet, thus returning the oil to the compressor where it is needed.

Example 2

R-421A (R-125/134a) and 17% Mineral Oil (MO)

Liquid R-421A, being comprised of only HFC refrigerants, will only absorb about [0.6%] mineral oil. For typical refrigeration or air conditioning compressors that normally discharge 1% to 2% oil as a percentage of refrigerant discharged, or up to 5% in extreme situations, there is potential to strand oil in the system as described below:

Compressor Discharge: regardless of the amount of MO discharged, the warmer (lower viscosity) oil will be pushed by R-421A vapor into the condenser.

Condenser: as R-421A is condensed to liquid, the MO will only mix up to the small amount indicated by Table 1 data, our about 0.6%. Any excess MO will remain as a separate phase. Since the oil and refrigerant are warm in this section, the viscosity should be low enough for the liquid refrigerant to push the oil through to the end of the condenser.

Receiver: if there is a receiver, the MO and R-421A will separate into two layers. The mineral oil phase, having a lower density, will float on top of the R-421A. Liquid R-421A will be drawn from the bottom of the receiver, removing only about 0.6% MO with it. The remaining MO will accumulate in the receiver over time.

Evaporator: the MO will continue to separate from the liquid R-421A in the evaporator as the mixture gets cold. When the R-421A boils off, the remaining MO will not retain much absorbed refrigerant and therefore will show a higher viscosity. It will be more difficult for the refrigerant vapor to push the thicker MO out of the evaporator.

Suction Line: R-421A vapor will try to push the MO through the suction line; however, the MO will not absorb much R-421A and will not, therefore, benefit from reduced viscosity. Eventually, as MO accumulates in the suction line, there will be enough pressure build-up and increase in vapor velocity to force the MO back to the compressor.

The system will eventually achieve a dynamic equilibrium with respect to oil circulation. The reduced level of mineral oil in the compressor will lead to a reduced amount of oil being discharged into the system, and eventually the amount of oil being returned will equal the amount of oil being discharged. In this case, however, a significant portion of the oil charge will be held up in the various components of the system and not in the compressor sump where it is required for proper lubrication.

Example 3

R-422A or R-422D (R-125/R-134a/R-600a) and Mineral Oil (MO)

Liquid R-422A and R-422D will only absorb about 0.92% MO or 0.49% MO respectively (Table 1). This amount of MO solubility is no better than for R-421A, which is essentially the same refrigerant blend but does not contain a hydrocarbon. Hydrocarbons do not, therefore, improve oil circulation by the mechanism of increased liquid solubility, but instead by absorption of the hydrocarbon into, and lowering the viscosity of, the MO phase.

For typical refrigeration compressors that normally discharge 1% to 2% oil as a percentage of refrigerant discharged, or up to 5% in extreme situations, there is potential to strand oil in the system as described below:

Compressor Discharge: regardless of the amount of POE discharged, the warmer (lower viscosity) oil will be pushed by R-422A or R-422D vapor into the condenser.

Condenser: as R-422A or R-422D is condensed to liquid, the MO will only mix up to about 0.92% or 0.49%, respectively. Any excess MO will remain as a separate phase. In the case of hydrocarbon-containing blends, however, the MO will absorb some of the hydrocarbon (isobutane for R-422A or D). This absorption, along with the warm temperature in this section, will lower the viscosity and allow the liquid refrigerant to push the oil through to the end of the condenser.

Receiver: if there is a receiver, the MO and R-422A or R-422D will separate into two layers. The mineral oil phase, having a lower density, will float on top of the R-422A or R-422D. Liquid refrigerant will be drawn from the bottom of the receiver, removing only about 0.92% or 0.49% MO, respectively, with it. The remaining MO will accumulate in the receiver over time.

Evaporator: the MO will continue to separate from the liquid R-422A or R-422D in the evaporator as the mixture gets cold. When the refrigerant boils off, the remaining MO will still retain much of the absorbed isobutane and therefore will show a lower viscosity. It will be easier for the refrigerant vapor to push the thinner MO out of the evaporator.

Suction Line: R-422A or R-422D vapor will push the MO through the suction line. This will be easier to do because the MO will still have the hydrocarbon absorbed in it, reducing the viscosity. The MO should readily move back to the compressor.

If there is holdup in the receiver, the system will eventually achieve a dynamic equilibrium with respect to oil circulation. The reduced level of mineral oil in the compressor will lead to a reduced amount of oil being discharged into the system, and eventually the amount of oil being returned will equal the amount of oil being discharged. In this case, however, a significant portion of the oil charge will be held up in the various components of the system and not in the compressor sump where it is required for proper lubrication.

Example 4

R-404A (R-125/R-143a/R-134a) and Mineral Oil (MO) with 10% Polyolester (POE) Lubricant (as a Percentage of Total Oil Charge)

Liquid R-404A will absorb about 5.64% of the MO/POE mixture. The addition of POE to the MO allows more total lubricant to be dissolved into the liquid refrigerant. For typical refrigeration compressors that normally discharge 1% to 2% oil as a percentage of refrigerant discharged, or up to 5% in extreme situations, oil return is accomplished as follows:

Compressor Discharge: regardless of the amount of MO/POE discharged, the warmer (lower viscosity) oil will be pushed by R-404A vapor into the condenser.

Condenser: as R-404A is condensed to liquid, the MO/POE will mix entirely (up to 5.64%) and move along to the end of the condenser.

Receiver: if there is a receiver, the MO/POE and R-404A will remain mixed (up to 5.64%) and move out along the liquid line to the valve.

Evaporator: the MO/POE will move with the liquid R-404A towards the end of the evaporator. When the R-404A boils off, the remaining MO/POE will retain some absorbed refrigerant (lowering its viscosity), and the MO/POE will be pushed out of the evaporator by the refrigerant vapor.

Suction Line: R-404A vapor will push the MO/POE, with absorbed R-404A and reduced viscosity, back along the tubing into the compressor inlet, thus returning the oil to the compressor where it is needed.

Example 5

R-422A or R-422D (R-125/R-134a/R-600a) and Mineral Oil (MO) with up to 25% Polyolester (POE) Lubricant (as a Percentage of Total Oil Charge)

Liquid R-422A or R-422D will absorb up to 4.66% of the MO/POE mixture. The addition of POE to the MO allows more total lubricant to be dissolved into the liquid refrigerant. For typical refrigeration compressors that normally discharge 1% to 2% oil as a percentage of refrigerants discharged, or up to 5% in extreme situations, oil return is accomplished as follows:

Compressor Discharge: regardless of the amount of MO/POE discharged, the warmer (lower viscosity) oil will be pushed by R-422A or R-422D vapor into the condenser.

Condenser: as R-422A or R-422D is condensed to liquid, the MO/POE will mix entirely (up to 4.66%) and move along to the end of the condenser.

Receiver: if there is a receiver, the MO/POE and R-422A or R-422D will remain mixed (up to 4.66%) and move out along the liquid line to the valve.

Evaporator: the MO/POE will move with the liquid R-422A or R-422D towards the end of the evaporator. When the refrigerant boils off, the remaining MO/POE will retain some absorbed refrigerant and the hydrocarbon, lowering its viscosity. The MO/POE will easily be pushed out of the evaporator by the refrigerant vapor.

Suction Line: R-422A or R-422D vapor will push the MO/POE, with absorbed refrigerant and hydrocarbon, back along the tubing into the compressor inlet, thus returning the oil to the compressor where it is needed.

Example 6

R-421A (R-125/R-134a) and Mineral Oil (MO) with 23% Polyolester (POE) Lubricant (as a Percentage of Total Oil Charge)

Liquid R-421A will absorb up to 4% of the MO/POE mixture. The addition of POE to the MO allows more total lubricant to be dissolved into the liquid refrigerant. For typical refrigeration compressors that normally discharge 1% to 2% oil as a percentage of refrigerant discharged, or up to 4% in extreme situations, oil return is accomplished as follows:

Compressor Discharge: regardless of the amount of MO/POE discharged, the warmer (lower viscosity) oil will be pushed by R-421A vapor into the condenser.

Condenser: as R-421A is condensed to liquid, the MO/POE will mix entirely (up to 4%) and move along to the end of the condenser.

Receiver: if there is a receiver, the MO/POE and R-421A will remain mixed (up to 4%) and move out along the liquid line to the valve.

Evaporator: the MO/POE will move with the liquid R-421A towards the end of the evaporator. When the refrigerant boils off, the remaining MO/POE will retain some absorbed refrigerant (lowering its viscosity), and the MO/POE will be pushed out of the evaporator by the refrigerant vapor. When employing this invention, hydrocarbon additives are not necessary since the MO/POE mixture will absorb enough of the HFC refrigerant to lower viscosity.

Suction Line: R-421A vapor will push the MO/POE, with absorbed R-421A and reduced viscosity, back along the tubing into the compressor inlet, thus returning the oil to the compressor where it is needed.

Although the invention has been shown and described with respect to certain preferred embodiments, it is obvious that equivalent alterations and modifications will occur to others skilled in the art upon the reading and the understanding of the specification. The present invention includes all such equivalent alterations and modifications, and is limited only by the scope of the claims.

What is claimed is:

1. A method of increasing the solubility of oil in a hydrofluorocarbon refrigerant composition of a system using a refrigerant compressed with a mechanical device comprising the steps of:
    directly adding a polyolester to a hydrofluorocarbon refrigerant to obtain the hydrofluorocarbon refrigerant composition;
    adding the resulting hydrofluorocarbon refrigerant composition to a system containing a lubricating oil, where said polyolester is added in an amount effective to solubilize the lubricating oil of the system into the hydrofluorocarbon refrigerant composition.

2. The method as recited in claim 1, wherein the refrigerant composition includes refrigerants consisting essentially of hydrofluorocarbons or hydrofluorocarbon-hydrocarbon mixtures.

3. The method as recited in claim 1, wherein a viscosity of the polyolester is greater than a viscosity of the refrigerant composition.

4. The method as recited in claim 1, wherein an amount of polyolester added is approximately 1-20% by weight of the total refrigerant composition.

5. The method as recited in claim 1, wherein the system is a hermetic, semi-hermetic or open-drive compressor.

6. The method as recited in claim 1, wherein the lubricating oil in said system is a paraffin, naphthene, aromatic, alkylaryl, synthetic paraffin or polyalphaolefin.

7. The method of claim 1, comprising adding the hydrofluorocarbon refrigerant composition to said system without replacing the lubricating oil in the system.

8. The method of claim 7, wherein said hydrofluorocarbon refrigerant composition comprises said polyolester and at least one refrigerant consisting essentially of at least one hydrofluorocarbon in the absence of chlorine and bromine atoms.

9. A method of optimizing mineral oil return in a system using a refrigerant compressed with a mechanical device comprising the step of:
    adding approximately 1-20% by weight of polyolester directly to a refrigerant composition, and charging a mixture of the polyolester and refrigerant composition into the system, said refrigerant composition comprising a lubricating oil and a refrigerant consisting essentially of hydrofluorocarbons, and where said polyolester is present in an amount effective to solubilize said lubricating oil into said hydrofluorocarbon refrigerant.

10. The method as recited in claim 9, wherein the refrigerant composition includes hydrofluorocarbons.

11. The method as recited in claim 9, wherein a viscosity of the polyolester is greater than a viscosity of the refrigerant composition.

12. The method as recited in claim 9, wherein the system is a hermetic, semi-hermetic or open-drive compressor.

13. A method of cleansing heat exchange tubes of a system using a refrigerant compressed with a mechanical device comprising the step of adding a polyolester directly to a refrigerant composition prior to charging a mixture of the polyolester and refrigerant composition into the system, said refrigerant composition including a lubricating oil, and a refrigerant comprising hydrofluorocarbons, wherein said polyolester is present in an amount effective to cleanse surfaces of the heat exchange tubes and solubilize the lubricating oil in the hydrofluorocarbon refrigerant.

14. The method as recited in claim 13, wherein the refrigerant composition comprises a refrigerant consisting essentially of hydrofluorocarbons or hydrofluorocarbon-hydrocarbon mixtures.

15. The method as recited in claim 13, wherein a viscosity of the polyolester is greater than a viscosity of the refrigerant composition.

16. The method as recited in claim 13, wherein approximately 1-20% by weight of the polyolester is added to the refrigerant composition, based on a total weight of the refrigerant composition.

17. The method of claim 13, wherein said lubricating oil is mineral oil.

* * * * *